United States Patent [19]

Girard

[11] Patent Number: 5,024,152
[45] Date of Patent: Jun. 18, 1991

[54] QUARTER TURN BALE DISCHARGE APPARATUS

[75] Inventor: David E. Girard, Goessel, Kans.

[73] Assignee: Hay & Forage Industries, Hesston, Kans.

[21] Appl. No.: 523,016

[22] Filed: May 14, 1990

[51] Int. Cl.$^5$ .................. B30B 1/00; A01D 75/00; B65G 11/00
[52] U.S. Cl. ...................... 100/188 R; 56/473.5; 193/5
[58] Field of Search ............. 100/1, 7, 35, 179, 188 R; 56/473.5, 474; 193/5, 47

[56] References Cited

U.S. PATENT DOCUMENTS

| | | | |
|---|---|---|---|
| 2,722,096 | 11/1955 | Tice et al. | 56/473.5 |
| 3,126,069 | 3/1964 | Shepley | 100/188 R X |
| 3,161,008 | 12/1964 | Shepley et al. | 100/188 R X |
| 3,820,453 | 6/1974 | Tipton | 100/188 R |

Primary Examiner—Harvey C. Hornsby
Assistant Examiner—Stephen F. Gerrity
Attorney, Agent, or Firm—Hovey, Williams, Timmons & Collins

[57] ABSTRACT

A bale discharge apparatus for use in guiding each of a plurality of bales of crop material between a bale forming chamber of a baler and the ground includes a bale turning assembly for turning each bale onto one of the lateral sides as the bale is delivered from the bale forming chamber. A table is provided for receiving each turned bale after the bale has been turned onto one of the lateral sides by the bale turning assembly, and the table is supported beneath the bale turning assembly at a height adapted to position the turned bale at least partially within the path of the next delivered bale so that the front end of the next delivered bale engages the rear end of the turned bale and pushes the turned bale from the table onto the ground. A method of guiding each of a plurality of bales of material between the bale forming chamber and the ground as each of the bales is delivered from the bale forming chamber is also disclosed.

10 Claims, 2 Drawing Sheets

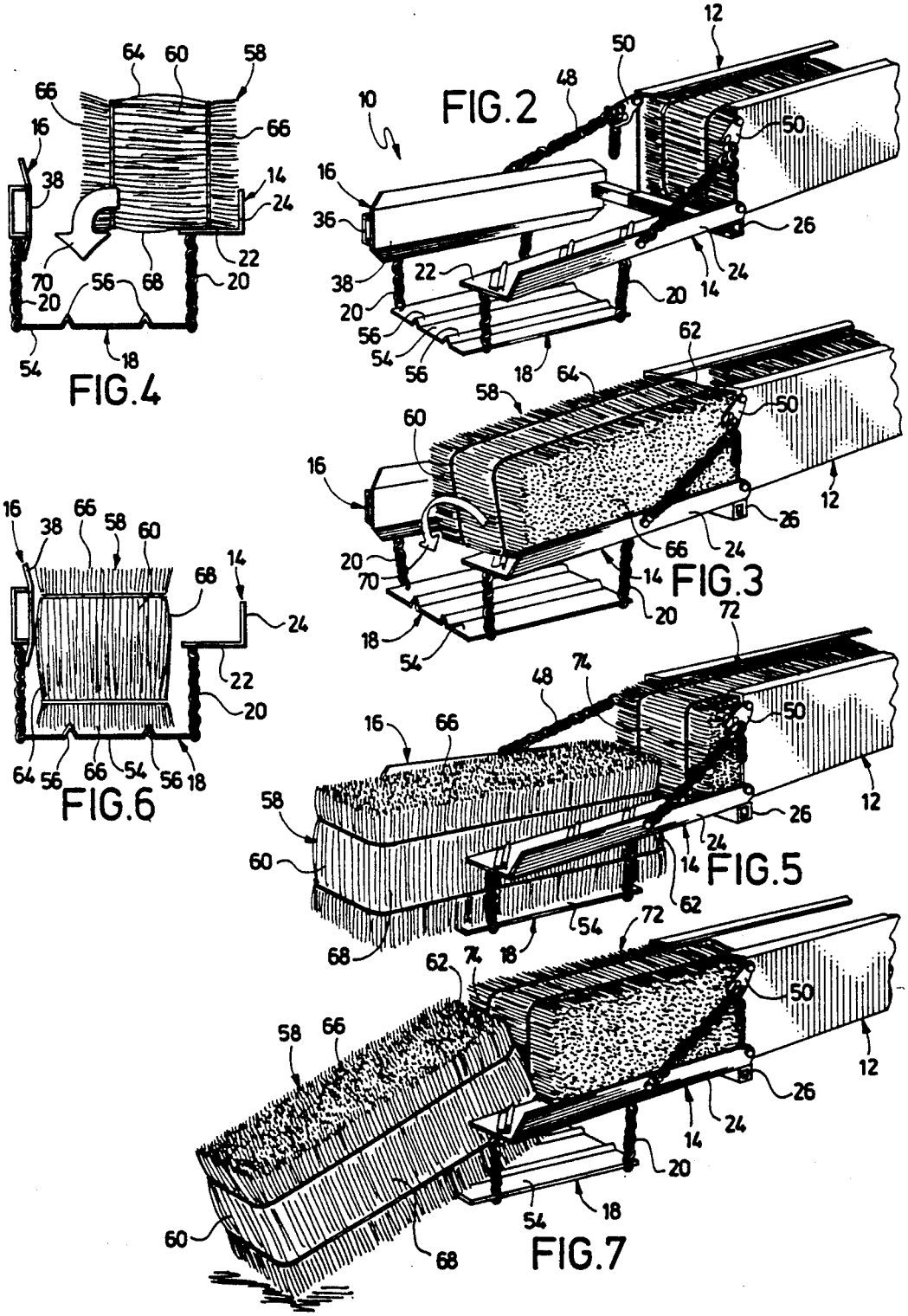

QUARTER TURN BALE DISCHARGE APPARATUS

BACKGROUND OF THE INVENTION

1. Field of the Invention

The present invention relates generally to baling devices and, more particularly, to a bale discharge apparatus for use in guiding each of a plurality of bales of crop material between a bale forming chamber of a baler and the ground as each of the bales is delivered from the bale forming chamber.

2. Discussion of the Prior Art

Crop baling devices are available for baling crop material and the like into bales of generally parallelepipedal shape each having a predetermined height and width and defining top and bottom sides, lateral sides, and front and rear ends. In these known balers, the formed bales are of a size small enough to permit manual handling thereof without the need for mechanical expedients to move the bales from one location to another.

However, in order to permit the bales to be handled in large quantities, mechanical bale retrievers exist which travel behind a baler picking up the bales after they are discharged. Typically, in order for known mechanical retrievers to operate, the bales discharged from the baler must be turned onto one of their lateral sides rather than resting on the ground in the same orientation as that of bales exiting the baler.

In order to achieve this quarter-turning of the bales exiting the baler, it is known to provide a chute assembly that includes a generally horizontal plate underlying the path of exiting bales and extending laterally inward of the path by a distance of less than about one half the width of the bales such that as the bales move across the plate when exiting the bale forming chamber of the baler, they fall sideways from the plate. A gap is defined by the chute assembly adjacent the plate through which the bales are permitted to fall to the ground after they have been turned.

A problem encountered in the use of these known types of chute assemblies on balers resides in the occurrence of bales rolling from their side surfaces as they contact the ground after exiting the baler. As mentioned above, it is necessary for the bale to be properly oriented on one of its lateral sides in order for a mechanical bale retriever to operate in a satisfactory manner. Thus, there is a need for an apparatus which will permit bales to be safely guided to the ground from the baler without turning over.

One attempted solution to this problem includes the use of a strip of flexible material which is attached to an outlet end of the bale forming chamber of a baler. By providing such a strip which extends behind the baler by a short distance, turned bales dropping from the chute assembly engage the strip and are slowed in their descent to the ground until the movement of the baler pulls the strip from beneath the bale causing the bale to be left on the ground behind the baler. However, this attempted solution does not provide satisfactory guiding of bales from the baler to the ground and the problem of bales rolling off of their lateral side surfaces as they exit the baler continues to occur even when such a strip is used.

OBJECTS AND SUMMARY OF THE INVENTION

It is an object of the present invention to provide a chute apparatus for use in guiding each of a plurality of bales of crop material or the like between a bale forming chamber of a baler and the ground as each of the bales is delivered from the bale forming chamber, wherein the bales are placed on the ground after being turned onto one of their lateral side surfaces.

It is another object of the invention to provide a bale chute apparatus in which a bale is retained on the apparatus in close proximity to the ground after having been turned, and a subsequently delivered bale pushes the turned bale from the apparatus onto the ground.

In accordance with one aspect of the invention, a bale discharge apparatus is provided for use in guiding each of a plurality of bales of crop material between a bale forming chamber of a baler and the ground, wherein each bale is of a generally parallelepipedal shape having a predetermined height and width and defining top and bottom sides, lateral sides, and front and rear ends. The apparatus comprises bale turning means for turning each bale onto one of the lateral sides as the bale is delivered along a predetermined path from the bale forming chamber, a table for receiving each turned bale after the bale has been turned onto one of the lateral sides, and means for supporting the table beneath the bale turning means at a height beneath the bale turning means of less than the width of the bale so that the turned bale is positioned at least partially within the predetermined path of the next delivered bale. In this manner, the front end of the next delivered bale engages the rear end of the turned bale and pushes the turned bale from the table onto the ground.

A method of guiding each of a plurality of bales of material between a bale forming chamber of a baler and the ground as each of the bales is delivered from the bale forming chamber comprises the steps of turning each bale onto one of the lateral sides as the bale is delivered along a predetermined path from the bale forming chamber and positioning each turned bale on a bale receiving plate that is supported beneath the bale turning assembly at a height adapted to position the turned bale at least partially within the predetermined path of the next delivered bale. Thereafter, the next bale is delivered from the bale forming chamber and engages the rear end of the turned bale pushing the turned bale from the table onto the ground.

By constructing a bale discharge apparatus in accordance with the present invention, or by practicing the method of the invention, numerous advantageous results are achieved. For example, by providing a table for receiving each bale as the bale is falls from the turning assembly, turning of the bale is completed prior to the bale being lowered to the ground. Thus, there is less of a tendency for the bale to continue turning as it drops from the baler.

BRIEF DESCRIPTION OF THE DRAWING FIGURES

A preferred embodiment of the invention is described in detail below with reference to the attached drawing figures, wherein:

FIG. 2 is a perspective view of the rear end of a baler and of the preferred bale discharge apparatus;

FIG. 3 is a perspective view of the bale discharge apparatus illustrating the movement of a bale being delivered from the baler;

FIG. 4 is an end view of the bale discharge apparatus illustrating the position of the bale shown in FIG. 3;

FIG. 5 is a perspective view of the bale discharge apparatus illustrating the bale after the bale has been turned onto a lateral side thereof;

FIG. 6 is an end view of the bale discharge apparatus illustrating the position of the turned bale shown in FIG. 5; and FIG. 7 is a perspective view of the bale discharge apparatus illustrating the turned bale as it is pushed from the apparatus by the next bale delivered from the baler.

DETAILED DESCRIPTION OF THE PREFERRED EMBODIMENT

Figure 1:
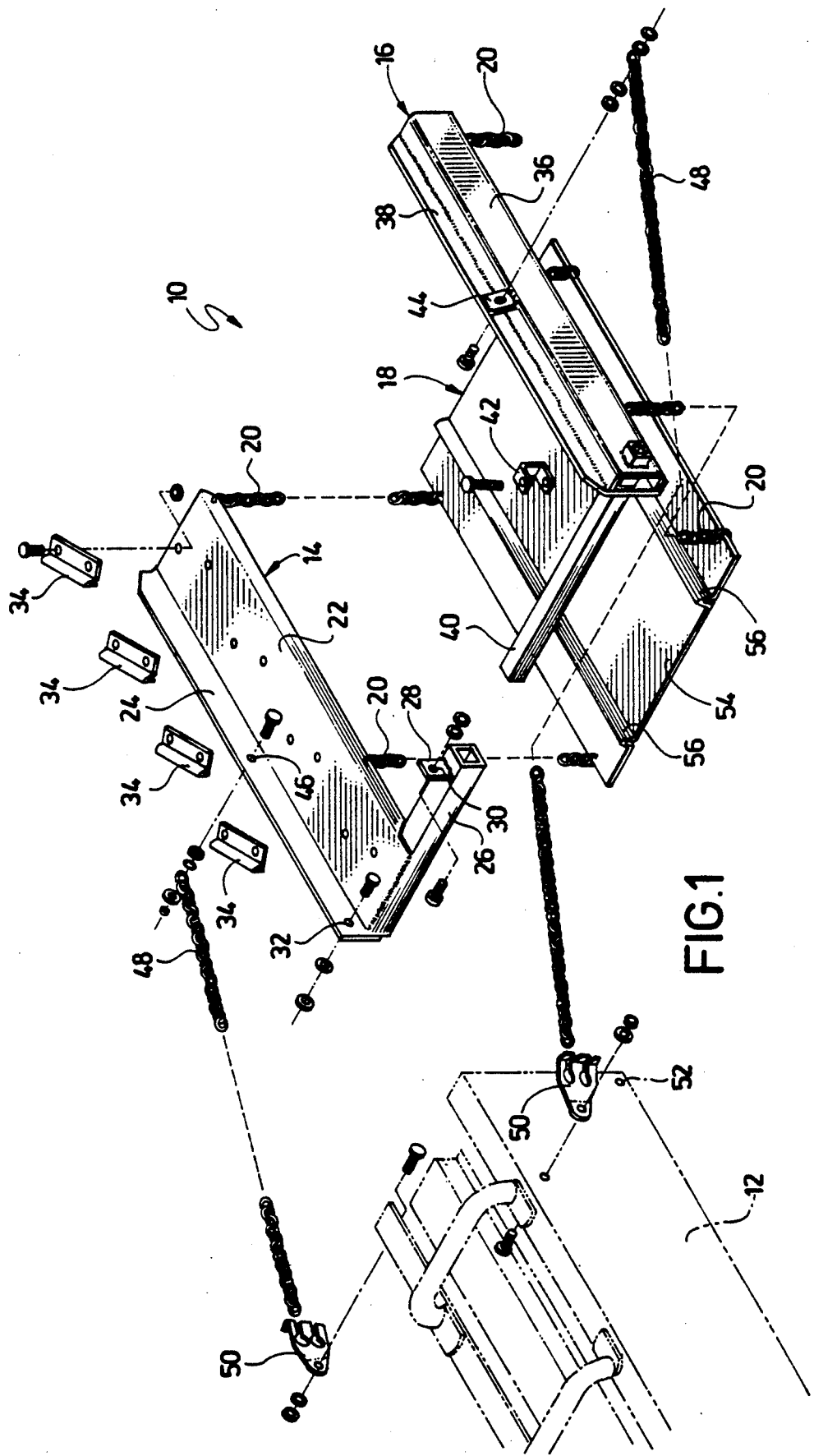
FIG. 1 is an exploded perspective view of a bale discharge apparatus constructed in accordance with the preferred embodiment of the invention.

A bale discharge apparatus 10 constructed in accordance with a preferred embodiment of the invention is illustrated in FIG. 2, as being adapted for connection to the outlet end of a bale forming chamber 12 of a baling device.

The discharge apparatus 10 generally includes a chute assembly 14, a channel assembly 16, and a discharge table 18 supported beneath the chute and channel assemblies by a plurality of chains 20 or the like. The chute assembly 14 is shown in FIG. 1, and includes a generally planer turning plate 22 adapted to hang from the outlet end of the bale forming chamber 12, and extending laterally beneath the path of exiting bales by a distance of less than about one half the width of the bales. By this construction, as the bales move across the plate 22 when exiting the bale forming chamber, they fall sideways from the plate.

A flange 24 is formed along one side of the turning plate 22 for preventing bales from falling from the turning plate in a direction other than that desired, and a transverse hollow bar 26 having a generally square cross-sectional shape extends along one axial end of the turning plate. An upstanding tab 28 is welded or otherwise provided on the transverse hollow bar 26 and is spaced from the flange 24 of the turning plate 22 by a distance substantially equal to the width of the outlet end of the bale forming chamber 12. The tab 28 and the flange 24 are provided with holes 30, 32 permitting the chute assembly 14 to be attached to the outlet end of the bale forming chamber 12 for pivotal movement relative to the baler.

A plurality of angle stops 34 are attached to the upper surface of the turning plate 22 by bolts or the like, and are angled toward the flange 24 when viewed in the direction of travel of bales exiting the bale forming chamber 12. By orienting the angle stops 34 in this manner, bales exiting the bale forming chamber 12 are guided by the angle stops 34 toward a position in contact with the flange 24 such that the bales are held against the flange until falling from the turning plate 22.

The channel assembly 16 includes a U-shaped channel 36 and an elongated side stop 38 that is welded or otherwise affixed to the channel. A transverse hollow rod 40 having a square cross-sectional shape is attached to one axial end of the channel 36 and side stop 38. The rod 40 is smaller than the bar 26 and is adapted to be received within the bar 26 such that relative transverse movement between the channel assembly 16 and the chute assembly 14 is permitted in order to allow adjustment of the size of a gap defined between the turning plate 22 and the side stop 38.

A motion limiting stop 42 is provided on the hollow rod 40 and restricts the movement of the channel assembly 16 toward the chute assembly 14 beyond a certain preset distance so that a minimum gap width may be set. By properly adjusting the position of the channel assembly 16 relative to the chute assembly 14, it is possible to insure that bales will fall from the turning plate 22 onto the table 18 without rolling too far in the turning direction and the bales are prevented from rolling off of their lateral sides.

The channel assembly 16 is provided with a hole 44 disposed intermediate the axial ends thereof, the chute assembly 14 includes a hole 46 provided intermediate the ends of the turning plate 22, and a pair of chains 48 are provided for connecting the chute and channel assemblies to the bale forming chamber 12, the chains 48 being connected through the holes 44, 46. A pair of brackets 50 are attached to the bale forming chamber 12 and these brackets are adapted to receive the chains 48 extending between the bale forming chamber and the chute apparatus 10 and to support the apparatus relative to the baler. Thus, the chute apparatus 10 is attached to the baler both by bolts or the like extending through holes 52 in the baler and holes 30, 32 in the flange 24 and tab 28 of the chute assembly 14, and by the chains 48 which extend between the holes 44, 46 and the brackets 50.

The discharge table 18 includes a bale receiving plate 54 which is supported beneath the chute and channel assemblies 14, 16 by the chains 20. The plate 54 is preferably formed of a single sheet of material having a generally flat shape except for one or more ridges 56 which guide each turned bale from the plate 54 onto the ground in a manner described more fully below. Preferably, each ridge 56 extends in a direction parallel with the direction of the path of the bales exiting the bale forming chamber 12.

The discharge apparatus 10 is illustrated in an assembled condition in FIG. 2. As shown, the chute and channel assemblies 14, 16 are pivotally connected to the baler at the lower end of the outlet of the bale forming chamber 12, and are also supported on the baler by the chains 48 which permit the assemblies 14, 16 to pivot upward relative to the baler while preventing downward pivoting of the assemblies.

Depending from the chute and channel assemblies 14, 16 is the discharge table 18 which is supported by the chains 20. If the bale receiving plate 54 engages the ground during movement of the baler, the chains 20 permit the plate 54 to move relative to the chute and channel assemblies 14, 16 to prevent breakage of the apparatus.

Operation of the chute apparatus is discussed with reference to FIGS. 3-7, wherein the various positions of a bale 58 being discharged from a baler are shown.

Initially, with reference to FIG. 3, a bale 58 exiting the bale forming chamber 12 presents front and rear ends 60, 62, a top side 64, and two lateral sides 66. The bale 58 also includes a bottom side 68 as shown in FIG. 4, which travels across the upper surface of the turning plate 22 until reaching a position just beyond that shown in FIG. 3, with the rear end 62 of the bale 58 outside the bale forming chamber 12 of the baler. As the bale 58 clears the bale forming chamber, it falls in the direction of the arrow 70 in FIGS. 3 and 4, due to the narrow width of the turning plate 22 which is generally less than one-half the width of the bale 58.

As the bale falls, it rotates in the direction of the arrow 70 onto one of its lateral sides 66 and is caught by the bale receiving plate 54 as shown in FIG. 5. The transverse position of the channel assembly 16 relative to the chute assembly 14 should be adjusted so that the channel assembly permits the bale 58 to fall to the discharge table 18 while preventing the bale from turning beyond a quarter-turn position prior to landing on the discharge table. If the channel assembly 16 is improperly positioned, the motion limiting stop 42 may be repositioned on the rod 40 so that the minimum gap defined between the chute and channel assemblies is adjusted to be either widened or narrowed.

The bale receiving plate 54 is supported beneath the turning plate 22 at a height adapted to position the turned bale 58 at least partially within the predetermined path of the next delivered bale 72 so that as the next bale is delivered, the front end 74 thereof engages the rear end 62 of the turned bale 58 and pushes the turned bale from the table 18 onto the ground. As shown in FIG. 5, in order to achieve this positioning of the turned bale 58, bale receiving plate 54 is supported beneath the turning plate 22 at a distance from the turning plate of less than the width of the bale 72. Also, the channel assembly 16, as shown in FIG. 6 insures that the turned bale 58 is retained laterally within the path of the next delivered bale 72 until the turned bale has been guided to the ground.

The final step of operation is illustrated in FIG. 7, wherein the next delivered bale 72 has been discharged from the bale forming chamber 12 and has reached a position in which it will begin to fall from the chute assembly 14 in a manner similar to that of the previously turned bale 58. As mentioned, the movement of the next delivered bale 72 from the bale forming chamber 12 results in the previously turned bale 58 being pushed from the bale receiving plate 54 onto the ground.

Because the receiving plate 54 is disposed in close proximity to the ground, the bale has a relatively short distance to travel and thus is less inclined to fall from its lateral side surface 66 as it hits the ground. Further, because the bale 58 is turned onto a lateral side 66 and then permitted to settle on the receiving plate 54 prior to being pushed to the ground, there is little tendency for the bale to roll from the apparatus when it is dropped to the ground. The ridges 56 on the upper surface of the bale receiving plate 54 also reduce the chance of improper bale rotation as it is guided to the ground.

Although the invention has been described with reference to the illustrated preferred embodiment, it is understood that substitutions may be made and equivalents employed herein without departing from the scope of the invention as recited in the claims.

What is claimed is:

1. A bale discharge apparatus for use in guiding each of a plurality of bales of crop material between a bale forming chamber of a baler and the ground as each of the bales is delivered from the bale forming chamber, wherein each bale is of a generally parallelepipedal shape having a predetermined height and width and defining top and bottom sides, lateral sides, and front and rear ends, the bale chute apparatus including a bale turning assembly for turning each bale onto one of the lateral sides as the bale is delivered along a predetermined path from the bale forming chamber, wherein the improvement comprises:

a table for receiving each turned bale after the bale has been turned onto one of the lateral sides by the bale turning assembly; and means for supporting the table beneath the bale turning assembly at a height adapted to position the turned bale at least partially within the predetermined path of the next delivered bale so that the front end of the next delivered bale engages the rear end of the turned bale and pushed the turned bale from the table onto the ground, said supporting means including flexible means yieldably suspending the table beneath the turning assembly in a manner to permit the table to freely rise and fall and rock fore-and-aft and side-to-side as necessary to slide over obstructions in the field.

2. The bale discharge apparatus as recited in claim 1, wherein the table is a bale receiving plate, said flexible suspending means being adapted to permit the bale receiving plate to move in a direction toward the bale turning assembly while preventing movement of the bale receiving plate away from the bale turning assembly beyond the height adapted to position the turned bale at least partially within the predetermined path of the next delivered bale.

3. The bale discharge apparatus as recited in claim 2, wherein said flexible suspending means comprises a plurality of chains extending between the bale turning assembly and the bale receiving plate.

4. The bale discharge apparatus as recited in claim 2, further comprising bale guiding means disposed on the bale receiving plate for guiding each turned bale from the table onto the ground as the next delivered bale pushes the turned bale from the table.

5. A bale discharge apparatus for use in guiding each of a plurality of bales of crop material between a bale forming chamber of a baler and the ground as each of the bales is delivered from the bale forming chamber, wherein each bale is of a generally parallelepipedal shape having a predetermined height and width and defining top and bottom sides, lateral sides, and front and rear ends, the bale chute apparatus including a bale turning assembly for turning each bale onto one of the lateral sides as the bale is delivered along a predetermined path from the bale forming chamber, wherein the improvement comprises:

a table for receiving each turned bale after the bale has been turned onto one of the lateral sides by the bale turning assembly; and means for supporting the table beneath the bale turning assembly at a height adapted to position the turned bale at least partially within the predetermined path of the next delivered bale so that the front end of the next delivered bale engages the rear end of the turned bale and pushes the turned bale from the table onto the ground, said table comprising a bale-receiving plate, and the means for supporting the table beneath the bale turning assembly includes means for permitting the bale receiving plate to move in a direction toward the bale turning assembly while preventing movement of the bale receiving plate away from the bale turning assembly beyond the height adapted to position the turned bale at least partially within the predetermined path of the next delivered bale, said bale receiving plate having bale guiding means disposed thereon for guiding each turned bale from the table onto the ground as the next delivered bale pushes the turned bale from the table, the bale guiding means including at least one ridge on the bale receiving plate extending in a direction parallel with the direction in which the predetermined path of the next delivered bale extends.

6. A bale discharge apparatus for use in guiding each of a plurality of bales of crop material between a bale forming chamber of a baler and the ground, wherein each bale is of a generally parallelepipedal shape having a predetermined height and width and defining top and bottom sides, lateral sides, and front and rear ends, the apparatus comprising:

bale turning means for turning each bale onto one of the lateral sides as the bale is delivered along a predetermined path from the bale forming chamber;

a table for receiving each turned bale after the bale has been turned onto one of the lateral sides by the bale turning means; and means for supporting the table beneath the bale turning means at a height beneath the bale turning means of less than the width of the bale so that the turned bale is positioned at least partially within the predetermined path of the next delivered bale, the front end of the next delivered bale engaging the rear end of the turned bale and pushing the turned bale from the table onto the ground, said supporting means including flexible means yieldably suspending the table beneath the turning assembly in a manner to permit the table to freely rise and fall and rock fore-and-aft and side-to-side as necessary to slide over obstructions in the field.

7. The bale discharge apparatus as recited in claim 6, wherein the table is a bale receiving plate, said flexible suspending means being adapted to permit the bale receiving plate to move in a direction toward the bale turning means while preventing movement of the bale receiving plate away from the bale turning means beyond the height adapted to position the turned bale at least partially within the predetermined path of the next delivered bale.

8. The bale discharge apparatus as recited in claim 7, wherein said flexible suspending means comprises a plurality of chains extending between the bale turning means and the bale receiving plate.

9. The bale discharge apparatus as recited in claim 7, further comprising bale guiding means disposed on the bale receiving plate for guiding each turned bale from the table onto the ground as the next delivered bale pushes the turned bale from the table.

10. A bale discharge apparatus for use in guiding each of a plurality of bales of crop material between a bale forming chamber of a baler and the ground, wherein each bale is of a generally parallelepipedal shape having a predetermined height and width and defining top and bottom sides, lateral sides, and front and rear ends, the apparatus comprising:

bale turning means for turning each bale onto one of the lateral sides as the bale is delivered along a predetermined path from the bale forming chamber;

a table for receiving each turned bale after the bale has been turned onto one of the lateral sides by the bale turning means; and means for supporting the table beneath the bale turning means at a height beneath the bale turning means of less than the width of the bale so that the turned bale is positioned at least partially within the predetermined path of the next delivered bale, the front end of the next delivered bale engaging the rear end of the turned bale and pushing the turned bale from the table onto the ground, said table comprising a bale receiving plate, and the means for supporting the table beneath the bale turning means includes means for permitting the bale receiving plate to move in a direction toward the bale turning means while preventing movement of the bale receiving plate away from the bale turning means beyond the height adapted to position the turned bale at least partially within the predetermined path of the next delivered bale, said bale receiving plate having bale guiding means disposed thereon for guiding each turned bale from the table onto the ground as the next delivered bale pushes the turned bale from the table, the bale guiding means including at least one ridge on the bale receiving plate extending in a direction parallel with the direction in which predetermined path of the next delivered bale extends.

* * * * *